United States Patent Office 3,151,944
Patented Oct. 6, 1964

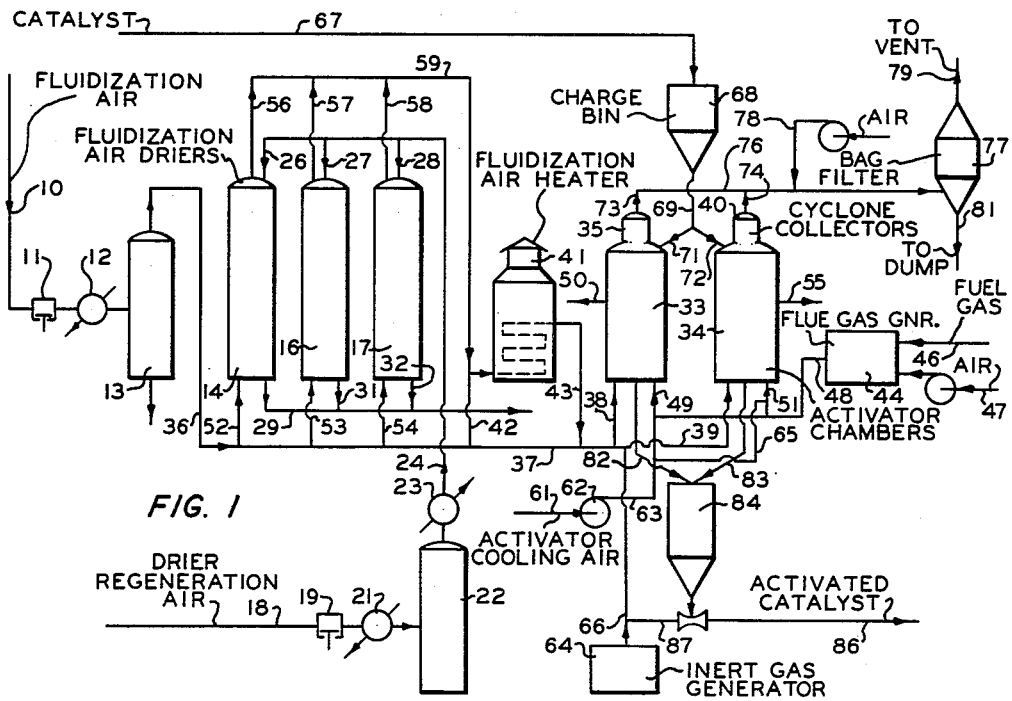
FIG. 1
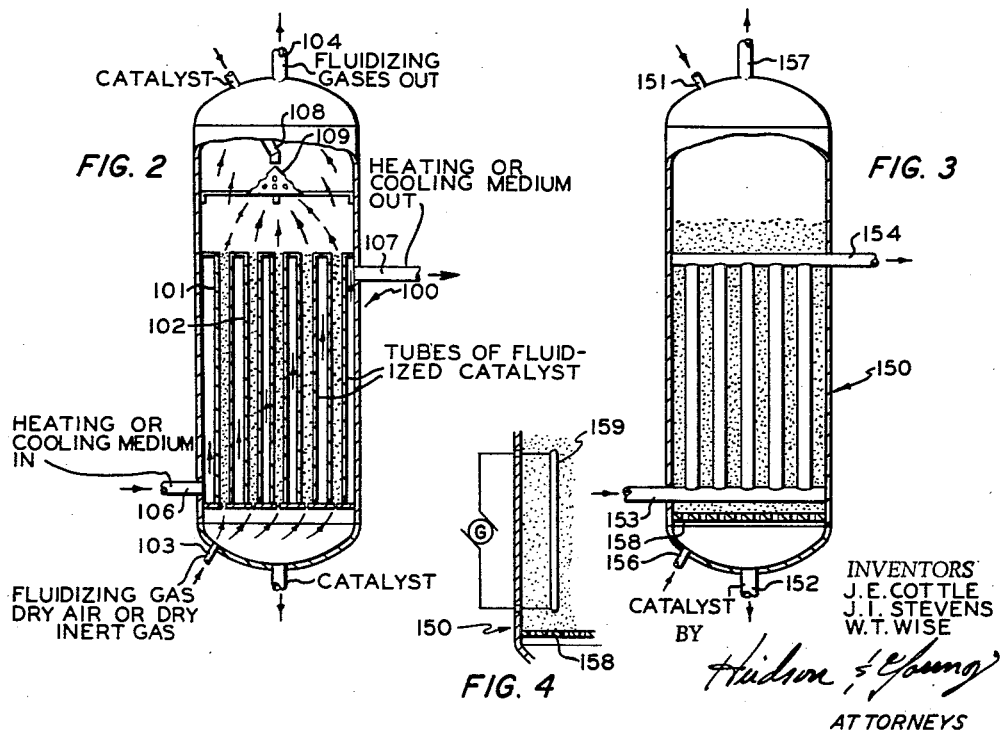
FIG. 2
FIG. 3
FIG. 4
INVENTORS
J. E. COTTLE
J. I. STEVENS
W. T. WISE
BY
*Hudson & Young*
ATTORNEYS

3,151,944
APPARATUS FOR CATALYST ACTIVATION
James I. Stevens, Idaho Falls, Idaho, John E. Cottle, Bartlesville, Okla., and William T. Wise, Milburn, N.J., assignors to Phillips Petroleum Company, a corporation of Delaware
Original application Oct. 14, 1955, Ser. No. 540,488, now Patent No. 2,987,487, dated June 6, 1961. Divided and this application Mar. 10, 1961, Ser. No. 94,771
4 Claims. (Cl. 23—288)

This invention relates to apparatus for the activation of catalysts. In a further aspect this invention relates to catalysts which are water-sensitive. In a further aspect, this invention is directed to the activation and regeneration of chromium oxide containing catalyst masses which are utilized in the polymerization of olefins at relatively low temperatures.

This application is a division of our copending application Serial No. 540,488, filed October 14, 1955, now U.S. Patent 2,987,487.

The copending application of Hogan and Banks, Serial No. 476,306, filed December 20, 1954, now abandoned, discloses the preparation of unique polymers by the polymerization of at least one aliphatic 1-olefin having a maximum chain length of 8 carbon atoms and no chain branching nearer the double bond than the 4-position by contacting with a catalyst comprising chromium oxide associated with at least one porous oxide selected from the group consisting of silica, alumina, zirconia, and thoria. The catalyst preferably contains at least 0.1 percent hexavalent chromium and more preferably at least 0.5 percent or more of hexavalent chromium. Olefins suitable for starting materials include ethylene, propylene, 1-butene, 1-pentene, 1-hexene, etc. Copolymers can be produced by the use of two or more such olefins together in the feed. The contacting can take place in the gaseous phase; or the feed olefin can be dissolved in a hydrocarbon which is liquid and inert under the polymerization conditions, and the solution can be contacted in the liquid phase with the catalyst. The process can be practiced by the use of a fixed bed or a mobile catalyst. The product polymers range in properties from viscous liquids to tacky solids to normally solid materials. Further details of this process appear in the cited application. Prior to the use of the catalyst in this polymerization process, it must be activated by a particular heat treatment. Furthermore, continued use of the catalyst results in the deposition of carbonaceous materials on the catalyst, which are apparently very heavy polymers. This deposit decreases the activity of the catalyst and regeneration or reactivation is necessary.

We have invented a new method for this activation or regeneration which is more economical than processes previously employed for the activation or regeneration. The catalyst is heated to a temperature of approximately 950° F., held at that temperature for several hours, and then cooled in a particular manner. Activation in a fluidized bed has been found to be especially suitable. In our process the activating gases are used in an amount sufficient to maintain the catalyst in a fluidized state but insufficient to supply the heat necessary for the activation. This additional heat is supplied by indirect heat exchange.

The following are objects of this invention.

An object of this invention is to provide a process and apparatus for the activation and regeneration of catalysts. A further object of this invention is to provide a process and apparatus for activation and regeneration of water-sensitive catalysts, the improved method being more economical than those previously utilized. A further object of this invention is to provide a method and apparatus for activating and regenerating a chromium oxide polymerization catalyst utilized in the polymerization of 1-olefins.

Other objects and advantages of this invention will be apparent to one skilled in the art upon reading this specification. Accompanying and forming a part of this specification is a drawing comprising:

FIGURE 1, a schematic drawing of the apparatus utilized in our invention;

FIGURE 2, a schematic drawing of an activator chamber illustrating one embodiment of our invention wherein the catalyst is treated in the tubes of the chamber;

FIGURE 3, illustrating a modification of the activator chamber wherein the catalyst is maintained in a fluidized bed in the shell; and FIGURE 4, showing a modification of the apparatus of FIGURE 3 using electrical heating means.

Some catalysts lose activity when exposed to water vapor and it is, therefore, essential to avoid contact of the catalyst with water vapor during the activation and the regeneration operations as well as during the conversion process in which the catalyst is utilized. Certain catalytic processes are operated at temperatures which are relatively low compared to the temperatures at which the catalyst is regenerated by burning off combustible deposit with an oxygen-containing gas. With such catalysts it is essential to heat up the catalyst to combustion supporting temperature and cool it down, after regeneration, to reaction temperature in contact with dry gas. The chromium oxide catalyst utilized in the olefin polymerization process of Hogan and Banks is such a catalyst.

It has been customary in the art to regenerate or reactivate oxide catalysts by treatment with an oxygen-containing gas at elevated temperature, e.g., as high as 1,200 to 1,500° F. In a copending application of R. L. Banks, Serial No. 448,785, filed August 9, 1954, now abandoned, it is shown that extended exposure of a chromium oxide catalyst of the type above described to such temperatures, especially in the presence of water, results in loss of activity of the catalyst for the promotion of such olefin polymerization, which loss is apparently due, at least in part, to the depression of the hexavalent chromium content of the catalyst. In the Banks disclosure, the chromium oxide polymerization catalyst is regenerated in a first step which comprises controlled oxidation of the carbonaceous deposits at a temperature below 800° F. and preferably in the range of 650 to 800° F., the first step being followed by a second step in which the catalyst is treated with an oxygen-containing gas, which can be pure oxygen or air, at a temperature in the range of 900 to 1,000° F., preferably 930 to 970° F., to complete the reactivation or regeneration. The duration of the second step is ordinarily at least two hours but can be continued for a longer time.

In the first step, the temperature is controlled by any suitable means preferably by controlling the free oxygen content and the rate of contacting of the catalyst with the regeneration gas. For this purpose, it is preferable that the free oxygen content be within the range of 1 to 10 volume percent of the regeneration gas, preferably from 1 to 5 volume percent. The oxygen can be diluted with an inert diluent such as nitrogen, carbon dioxide, or flue gas. It is preferable that hydrogen and water be absent from regeneration gas since these materials have a deleterious effect on the catalyst activity. The first step is continued until substantially all of the carbonaceous material deposited on the surface of the catalyst has been removed. Fresh catalyst, containing no carbonaceous material thereon, can be treated with air of normal oxygen content.

In the second step, the catalyst is contacted with an oxygen-containing gas which can be air or pure oxygen, at a temperature in the range of 900 to 1,000° F., this second step ordinarily requiring at least 2 hours and may be as long as 10 hours or more. For further details of this process and examples illustrating the desirability of maintaining the cited temperature limits, attention is directed to the above-mentioned Banks disclosure which includes the following additional embodiment, wherein the deactivated catalyst is treated at an elevated temperature, prior to the activation or regeneration treatment, to effect partial removal of the deposited polymer by cracking. It is ordinarily preferred to contact the catalyst with a stream of an inert gas such as nitrogen or methane for the described removal of deposited polymer. A suitable temperature for this treatment is within the range 650 to 800° F. This preliminary stripping or cracking treatment is beneficial in that part of the deposited carbonaceous material is thereby removed, and the oxidation and the temperature control in the ensuing first stage of the treatment with oxygen-containing gas are thereby facilitated.

The Banks disclosure is not limited to a particular method of treatment and discloses that the regeneration can be conducted with the catalyst in the form of a fluidized bed. Normally when a fluidized bed is used, it is the practice to pass all necessary regeneration gas through a bed of catalyst. Previous processes have used the specially dried air to supply all the necessary heat, and dry inert gas to supply all the necessary cooling. This results in a large usage of dry air and inert gas, both of these materials being expensive to prepare.

According to our invention, the catalyst is activated in a tubular type of activator, the catalyst being in either the tubes or the shell. The catalyst is kept in a fluidized state by passing just enough gas therethrough to maintain a satisfactory state of fluidization. The major amount of the heating and subsequent cooling is accomplished by indirect heat exchange. In the preferred system, heat is applied by passing hot gas, such as flue gas, through the activator, although the heating can be supplied by electrical means. Cooling is accomplished by passing any convenient cooling medium through the activator in indirect heat exchange with the catalyst which, as stated, is maintained in a fluidized condition by passing a specially prepared inert gas or dry air therethrough. This process results in uniform treatment of the entire mass of the catalyst and results in uniform activation.

Attention is now directed to the drawing wherein the apparatus of our invention is shown. A specific preferred activation process is included in this description of the apparatus. In FIGURE 1, fluidization air is supplied through conduit 10, this air being compressed in compressor 11, cooled in cooler 12, and condensate removed therefrom in vessel 13. In order to dry the air, we prefer to use a series of fluidization air dryers, illustrated schematically as 14, 16 and 17. Suitable drying agents include calcium sulfate, calcium chloride and silica-alumina. Using a series of dryers such as we have illustrated, provides a method of supplying a continuous stream of dried air since one chamber can be on standby, one can be under regeneration, while the third is in use. Regeneration air is supplied by means of conduit 18, this air being compressed in compressor 19, cooled in cooler 21, condensate removed therefrom in vessel 22 and heated in heater 23. This regeneration air is supplied by means of conduit 24 containing branches 26, 27, and 28 to dryers 14, 16 and 17, respectively. This regeneration gas is vented by means of conduits 29, 31, and 32. The dry air should have a dew point preferably below −60° F. at 40 p.s.i.a.

Now returning to the fluidization air, this air is passed from vessel 13 to the activator chambers 33 and 34 (provided with cyclone collectors 35 and 40, respectively) by means of different paths depending upon the particular stage of the activation process. The first stage of the treatment comprises heating the catalyst to a temperature of 500° F. over a period of 7 hours, undried air being suitable for this process, keeping in mind that a gas of reduced free oxygen content is necessary when the process is one of catalyst regeneration. This air can be supplied by conduits 36, 37 and 38 or 39, depending upon which activator chamber is on stream. The heating for the fluidization air is supplied by fluidization heater 41, the air passing to this heater through conduit 42 communicating with conduit 36. Extending from heater 41 is conduit 43, this conduit communicating with conduit 37. The temperautre can be controlled by passing all the gas through heater 41 or, and more preferably, the air heater 41 can be operated at a uniform temperature and an increasing amount of the air supplied to the activator chamber can be passed therethrough. The flow rate of the fluidization air depends, of course, upon the particle size of the catalyst but a suitable range is from 0.15 to 1.5 feet per second. Additional heat is supplied to the activator chamber, this being supplied by flue gas generator 44 provided with fuel supply conduit 46 and air supply conduit 47. The flue gas passing therefrom is introduced into the activator chambers by means of conduits 48 and 49 or 51. Conduits 50 and 55 are provided for removal of flue gas from chamber 33 and 34, respectively. As pointed out previously the heat supplied by this flue gas constitutes the major portion of the heat for the catalyst treatment.

Following this heating to 500° F., a further period of 3 hours is used to raise the temperature from 500 to 750° F. After reaching 750° F., further heat treatment is done in the presence of dry air. For this purpose, the air is passed through one of dryers 14, 16 or 17 from conduit 36 by means of conduits 52, 53 or 54. The dried air is passed by conduits 56, 57 or 58 to conduit 59 which communicates with air heater 41 and conduit 37 by means of conduit 42. In the same manner as temperature was controlled on the undried air, this temperautre control is obtained for the dry air. The temperature is increased from 750° F. to 950° F., the preferred activation temperature, over a period of approximately 2 hours. The temperature is maintained at approximately 950° F. for approximately 5 hours, utilizing the dry air as the fluidization gas.

At the end of this phase of the treatment the catalyst is cooled in a step-wise manner. Over a time interval of approximately 2 hours, dry air is passed over the catalyst, this reducing the temperature from 950° F. to approximately 750° F. As with the heating, the major portion of the heat exchange for cooling is indirect, activator cooling air being supplied by conduit 61 which extends to pump 62. Extending from pump 62 are conduits 63 and 65 which communicate with conduits 49 and 51, respectively. In this step the temperature fo the fluidization air is gradually decreased.

The last stage of the cooling is done in the presence of inert gas or dry air and the catalyst is cooled from the 750° F. to 100° F. over a period of time of approximately 10 hours. In FIGURE 1, we have shown an inert gas generator 64 having conduit 66 extending therefrom, this conduit communicating with conduit 37 to supply inert gas to chambers 33 and 34. An inert gas such as one having less than 5 parts per million of carbon monoxide and oxygen and from 0.1 to 0.2 percent by volume of hydrogen is satisfactory. The dew point is preferably reduced to −60° F. at 40 p.s.i.a.

Finally, the catalyst flow path will be described. This catalyst, supplied through conduit 67, is introduced into charge bin 68 and, by means of conduits 69, 71, and 72, to chambers 33 and 34. Conduits 73 and 74 are provided extending from the top of the activator chambers, these conduits communicating with conduit 76 which extends to filter 77, conduit 76 being provided with auxiliary air conduit 78. This auxiliary air is provided to cool the exhaust gases passing to the filter. From filter 77, conduit 79 extends to a vent and conduit 81 extends to a dump.

Following activation or regeneration, the catalyst is passed from the bottom of the activator chamber 33 or 34 by means of conduit 82 or 83 to collection chamber 84. As needed, activated catalyst is removed from collector 84 and passed to the point of use, a pneumatic gas transfer line being shown as conduit 86, this being supplied with inert gas by means of conduit 87 which, in turn, is connected to conduit 66.

FIGURES 2 and 3 represent preferred modifications of activator chambers suitable for use in our invention. FIGURE 2 represents the modification wherein the fluidized catalyst is treated within the tubes of the tubular chamber. In FIGURE 2 the chamber is indicated generally as 100 and is provided with tubes 101, 102 and the like. The inlet for the fluidizing gas is shown as conduit 103 and the outlet is conduit 104. The heating or cooling medium circulates in the shell in this modification, entering conduit 106 and leaving through conduit 107.

The catalyst is introduced through conduit 108 and distributed uniformly throughout the chamber by means of distributor 109. The bottom of each tube is provided with a restriction, thus providing for increased fluidization gas velocity therethrough in order to prevent loss of catalyst prior to the completion of the activation or regeneration operation.

FIGURE 3 illustrates an alternative to FIGURE 2, FIGURE 3 showing the catalyst in the shell and the indirect heat exchange medium in the tubes of the chamber. In this figure, the catalyst is introduced into chamber 150 by means of conduit 151 and removed through conduit 152. The heating or cooling medium enters through conduit 153 and leaves through conduit 154. The fluidizing gas is introduced through conduit 156 and removed by means of conduit 157. In this modification, a perforated plate 158 is provided in the lower portion of chamber 150, this plate serving as the support for the fluidized bed of catalyst in the chamber.

As stated above, the heating can be supplied by electrical means rather than by hot gas. As shown in FIGURE 4, electrical heating means 159 is provided within chamber 150, replacing the hot gas heat exchange tubes shown in FIGURE 3.

Those skilled in the art will recognize that some form of disengaging device is necessary in the upper portion of chambers 100 and 150. For simplicity these are not shown in the drawing. While not wishing to be limited thereto one suitable form of such a disengager, is shown in Brooke, 2,698,224. Furthermore, valves and other process control equipment are omitted but their use is obvious to one skilled in the art.

The specific temperatures and times set for the above in connection with the description of the apparatus are given to illustrate a specific embodiment of our invention and it should be understood that some variation therein can be used without departing from the scope of our invention. Specifically, a catalyst was prepared by impregnating a coprecipitated gel composite consisting of 90 weight percent silica and 10 weight percent alumina with chromic nitrate. The total chromium content of this catalyst was 2.5 weight percent. This catalyst was activated by heating it from 100 to 500° F. over a period of 7 hours in the presence of undried air. During a further period of 3 hours the temperature was raised from 500 to 750° F., still using undried air. At this point the activating chambers were switched to dry air and, over a period of 2 hours, the temperature was raised from 750 to 950° F. This latter temperature was maintained for 5 hours. After this treatment the catalyst was cooled for a total of 12 hours while the temperature was being gradually reduced, dry air being used for the first 2 hours while the temperautre was lowered to 750° F. and nitrogen was used for 10 hours to bring the temperature down to 100° F. Catalyst following such treatment is suitable for the polymerization of ethylene to produce polyethylene according to the process of Hogan and Banks, Serial No. 476,306, filed December 20, 1954, now abandoned. It has a very small reduction in chromium content while having the water completely removed therefrom.

As many possible embodiments may be made of this invention without departing from the scope thereof, it is to be understood that all matter herein set forth or shown in the accompanying drawings is to be interpreted as illustrative and not in a limiting sense.

We claim:

1. Apparatus for activating particulate catalyst comprising, in combination, gas drying means having gas inlet means connected to a source of fresh air and outlet means communicating therewith, gas heating means having a gas inlet and outlet, conduit means connecting said gas drying outlet means to the inlet of said gas heating means, at least one upright activaitng chamber, electrical means for heating catalyst within said chamber by indirect heat exchange, conduit means connecting the outlet of said gas heating means with said chamber to supply fluidization gas thereto, means for generating gas which is inert with respect to the activated catalyst, conduit means connecting said inert gas generating means with said chamber to supply fluidization gas thereto, conduit means for supplying catalyst to said chamber, gas outlet means extending from said chamber, and conduit means for removing catalyst from said chamber.

2. Apparatus for effecting activation of a catalyst comprising gas drying means having gas inlet means connected to a source of fresh air and outlet means communicating therewith, gas heating means having a gas inlet and outlet, a conduit extending from the outlet means of said gas drying means to the inlet of said gas heating means, at least one upright activating chamber, indirect heating means within said activating chamber, a conduit extending from the outlet of said gas heating means to said activating chamber to supply fluidization gas thereto, a catalyst supply conduit extending into said activating chamber, gas outlet means extending from said activating chamber, means for generating gas which is inert with respect to the activated catalyst, a conduit extending from said inert gas generating means to said activating chamber to supply fluidization gas thereto, and a catalyst removal conduit extending from said activating chamber.

3. Apparatus for effecting activation of a catalyst comprising gas drying means having gas inlet means connected to a source of fresh air and outlet means communicating therewith, gas heating means having a gas inlet and outlet, a conduit extending from the outlet means of said gas drying means to the inlet of said gas heating means, at least one activating chamber having a tube bundle therein, a conduit extending from the inlet of said gas heating means to said activating chamber to supply fluidization air thereto, a flue gas generator, a conduit extending from said flue gas generator to said tube bundle, a catalyst supply conduit extending into said activating chamber, gas outlet means extending from said activating chamber, means for generating gas which is inert with respect to the activated catalyst, a conduit extending from said inert gas generating means to said activating chamber to supply fluidization gas thereto, and a catalyst removal conduit extending from said activating chamber.

4. Apparatus for effecting activation of a catalyst comprising gas drying means having gas inlet means connected to a source of fresh air and outlet means communicating therewith, gas heating means having a gas inlet and outlet, a conduit extending from the outlet means of said gas drying means to the inlet of said gas heating means, at least one activating chamber having a tube bundle therein, a conduit extending from the outlet of said gas heating means to said tube bundle to supply fluidization air thereto, a flue gas generator, a conduit extending from said flue gas generator to said activation chamber, a catalyst supply conduit extending to said tube bundle, gas outlet means extending from said tube bundle, means for generating gas which is inert with respect to the activated catalyst, a conduit extending from said inert gas generating mean to said tube bundle to supply fluidization gas thereto, and a catalyst removal conduit communicating with said tube bundle.

References Cited in the file of this patent

UNITED STATES PATENTS

| | | |
|---|---|---|
| 1,869,736 | Berenbruch | Aug. 2, 1932 |
| 2,463,115 | Legatski | Mar. 1, 1949 |
| 2,530,977 | Martin | Nov. 21, 1950 |
| 2,571,380 | Penick | Oct. 16, 1951 |
| 2,730,556 | Liedholm | Jan. 10, 1956 |
| 2,794,772 | Savoca at al. | June 4, 1957 |
| 2,816,857 | Hemminger | Dec. 17, 1957 |
| 2,845,409 | Pennington et al. | July 29, 1958 |
| 2,954,281 | Schutt | Sept. 27, 1960 |

UNITED STATES PATENT OFFICE
CERTIFICATE OF CORRECTION

Patent No. 3,151,944            October 6, 1964

James I. Stevens et al.

It is hereby certified that error appears in the above numbered patent requiring correction and that the said Letters Patent should read as corrected below.

Column 6, line 17, for "activaitng" read -- activating --; line 51, for "inlet" read -- outlet --.

Signed and sealed this 27th day of July 1965.

(SEAL)
Attest:

ERNEST W. SWIDER
Attesting Officer

EDWARD J. BRENNER
Commissioner of Patents